United States Patent [19]
Sih

[11] Patent Number: 5,505,896
[45] Date of Patent: Apr. 9, 1996

[54] PROCESS FOR MANUFACTURING PRODUCT BY UTILIZING PROGRESSIVELY EXPANDING MOLD

[76] Inventor: George C. Sih, 605 Wedgewood Rd., Bethlehem, Pa. 18017

[21] Appl. No.: 227,023

[22] Filed: Apr. 13, 1994

[51] Int. Cl.$^6$ ................................................. B29C 45/26
[52] U.S. Cl. ..................... 264/328.7; 249/64; 264/328.8; 264/328.12; 425/577
[58] Field of Search .............................. 264/328.7, 328.8, 264/328.11, 328.12, 328.13; 425/577, 575; 249/63, 64

[56] References Cited

U.S. PATENT DOCUMENTS

| | | | |
|---|---|---|---|
| 3,068,522 | 12/1962 | Nickerson et al. | 264/328.7 |
| 4,071,532 | 1/1978 | Rose | 264/328.7 |
| 4,149,695 | 4/1979 | Quick et al. | 264/328.7 |
| 4,363,772 | 12/1982 | Hidding | 264/328.7 |
| 4,840,760 | 6/1989 | Oishi | 264/328.12 |
| 4,935,188 | 6/1990 | Sorensen | 264/328.7 |
| 5,082,604 | 1/1992 | Valyi | 264/40.5 |

FOREIGN PATENT DOCUMENTS

| | | | |
|---|---|---|---|
| 63-179722 | 7/1988 | Japan | 264/328.7 |
| 64-82904 | 3/1989 | Japan | 425/577 |

*Primary Examiner*—Jill L. Heitbrink
*Attorney, Agent, or Firm*—Christie, Parker & Hale

[57] ABSTRACT

A process for manufacturing product by using a progressively expanding mold comprises (a) using a stationary piece having a cavity therein and having an opening at one end thereof, (b) assembling a first movable piece in the cavity of the stationary piece, (c) filling a molten material from the opening between the stationary mold and the first movable piece, (d) causing the movable piece to move in an appropriate rate away from the opening for a further increment of the filled molten material between the pieces, (e) solidifying the filled molten material to yield a product, and (f) taking out the product from the stationary and first movable pieces. This invention discloses both a process and an apparatus for positive control of the rate of material solidification of a product and molding a more refined product.

7 Claims, 7 Drawing Sheets

PROCESS FOR MANUFACTURING PRODUCT BY UTILIZING PROGRESSIVELY EXPANDING MOLD

FIELD OF THE INVENTION

The present invention relates to a process and an apparatus for manufacturing a product, and more particularly to a process and an apparatus for manufacturing a product by application a progressively expanding mold.

BACKGROUND OF THE INVENTION

Forming of metal or polymeric pans is priorly accomplished by using the fixed or constant volume mold. That is, the general shape of the product is, for the most pan fixed by the mold construction and cannot be varied as one desires. The induced mechanical pressure and temperature are controlled in the molding process such that the product would acquire the desired microstructure, mechanical and/or fracture properties in addition to the appearance and geometric configuration. In situations where the speed and volume of production are of importance, injection molding is a choice adopted in practice. However, a limitation in the choice of product configuration has been found.

The rate of change of the volume with respect to the surface area, if not carefully controlled, could introduce defects and/or cracks in the formed products which are unacceptable. The rate at which the injected material accumulates locally must be controlled to minimize the excessive buildup of residual stresses and/or strains. Specimens with a large volume-to-surface area ratio are problematic because they are more vulnerable to cracking or break on account of non-uniform expansion or shrinkage. The shortcomings of the conventional mold for molding a product are summarized as follows:

1. The property of the molded product is poor;
2. The adjustments of imposed pressure and heat for molding are difficult to control;
3. The appearance and the outer surface of the product are rough and coarse;
4. The shape of the mold is fixed and limited in configuration; and
5. The manufacturing costs are raised due to a large ratio of imperfection of the products.

To free from forming stress-concentrating sites within a product during molding, and to produce a product having a constant or variable cross-sectional area, this invention was accordingly developed with these objectives in mind and is disclosed hereinafter.

SUMMARY OF THE INVENTION

An objective of the present invention is to offer a process and an apparatus for controlling the increase or decrease of the local stress or strain rate of the injected material in accordance with the geometric change of the molded product. Another objective of the present invention is to offer a process and an apparatus, for molding a product, having refined adjustments of in-situ mechanical pressure and temperature.

Another objective of the present invention is to offer a process and an apparatus for molding a product having a finer appearance.

Another objective of the present invention is to offer a process and an apparatus for molding a product having a precisely controlled configuration in any of three dimensions and in time scale during the molding process.

Another objective of the present invention is to offer a process and an apparatus for molding a product having a high quality in appearance and being more cost-effective.

In accordance with the present invention, a process for manufacturing a product by using a progressively expanding mold comprises (a) using a stationary piece having a cavity therein and having an opening at one end thereof, (b) assembling a first movable piece in the cavity of the stationary piece to form the progressively expanding mold, (c) filling a molten material from the opening between the stationary mold and the first movable piece, (d) causing the movable piece to move in a proper rate away from the opening for a further increment of the filled molten material between the pieces, (e) allowing the filled molten material to be solidified between the pieces to yield a product, and (f) taking out the product from the progressively expanding mold.

In accordance with another aspect of the present invention, further comprises a second movable piece by which together with said stationary piece a second segment of the product is produced.

In accordance with another aspect of the present invention, the second movable piece is caused to move in the cavity after a first segment of the product is formed by the first movable piece together with said stationary piece.

In accordance with another aspect of the present invention, the second movable pieces is caused to move at a rate the stone as or different from that of the first movable piece, and the first and second movable pieces are caused to move in the cavity during mold separation in order to separate the mold with relative ease.

In accordance with another aspect of the present invention, the opening is located at a central portion of the aforementioned one end.

In accordance with another aspect of the present invention, a shape of the product is determined by the pieces.

In accordance with another aspect of the present invention, the molten material is one selected from a group consisting of metals, polymers, and inorganic chemicals.

In accordance with another aspect of the present invention, further comprises a control system to control the rate for moving the first movable piece.

In accordance with another aspect of the present invention, an apparatus of a progressively expanding mold comprises a stationary piece having a cavity therein and having an opening at one end thereof and a first movable piece mounted in the cavity of the stationary piece, wherein the first movable piece is capable of being caused to move in the cavity with respect to the stationary piece in order to enhance the formation of the product.

In accordance with another aspect of the present invention, further comprises a second movable piece in order to form the product of multiple sections.

In accordance with another aspect of the present invention, the opening is located at a centroidal portion of the aforementioned one end.

The present invention may be best understood through the following description with reference to the accompanying drawings, in which:

DETAILED DESCRIPTION OF THE PREFERRED EMBODIMENT

This invention discloses a process for manufacturing a product by using a progressively expanding mold, comprising steps of using a stationary piece having a cavity therein and having an opening at one end thereof, assembling a first movable piece in the cavity of the stationary piece, filling a molten material from the opening between the stationary mold and the first movable piece, causing the movable piece to move in a proper rate away from the opening at a proper operating pressure for a further increment of the filled molten material between the pieces, allowing the filled molten material to be solidified in the progressively expanding mold at a proper operating temperature to yield a product; and taking out the product from the stationary and first movable piece. If necessary, a second movable piece is also utilized thereto.

Figure 1:
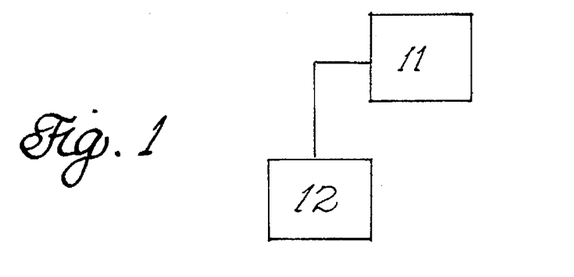
FIG. 1 is a schematic layout of a mold and a control system of this invention.

For establishing the necessary relations between pre-and-after molding material properties, the thermomechanical history and in-situ sensor data are required. Predictive mold forming process models can be developed to establish a knowledge-based control system 11 connected to the mold 12 as shown in FIG. 1 targeted to achieve the desired product-property in a consistent and verifiable manner. A series of pre-determined set point could be obtained to control the on-line molding process schedules.

Figure 2:
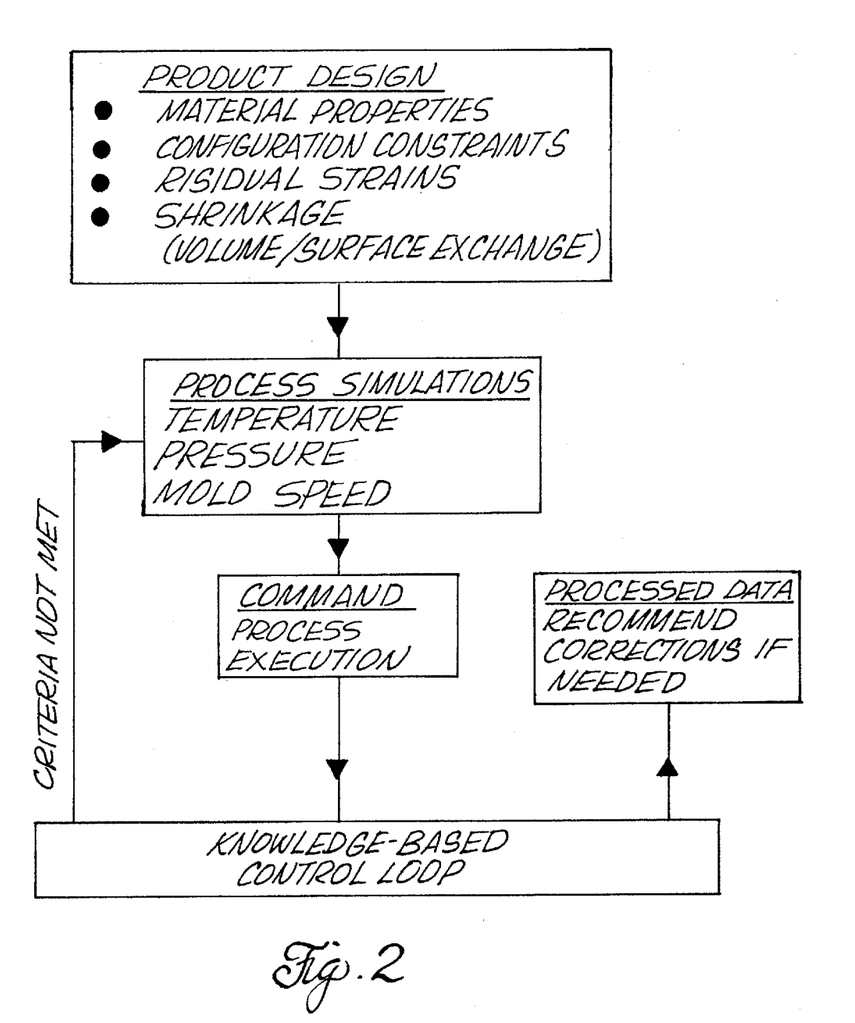
FIG. 2 is a schematic flow chart of a knowledge-based intelligent system for injection molding of this invention.

A flow chart of a knowledge-based intelligent system for injection molding is shown in FIG. 2. It focuses on identifying and controlling the variables that dictate specific product properties via the sensor data. The product performance determines what the material properties and configuration constraints of a product are. The evolution of temperature and pressure could be monitored and traced outside and inside the mold for the implementation of pre-determined set points in the process schedule. The mold speed is also controlled thereby.

Figure 3:
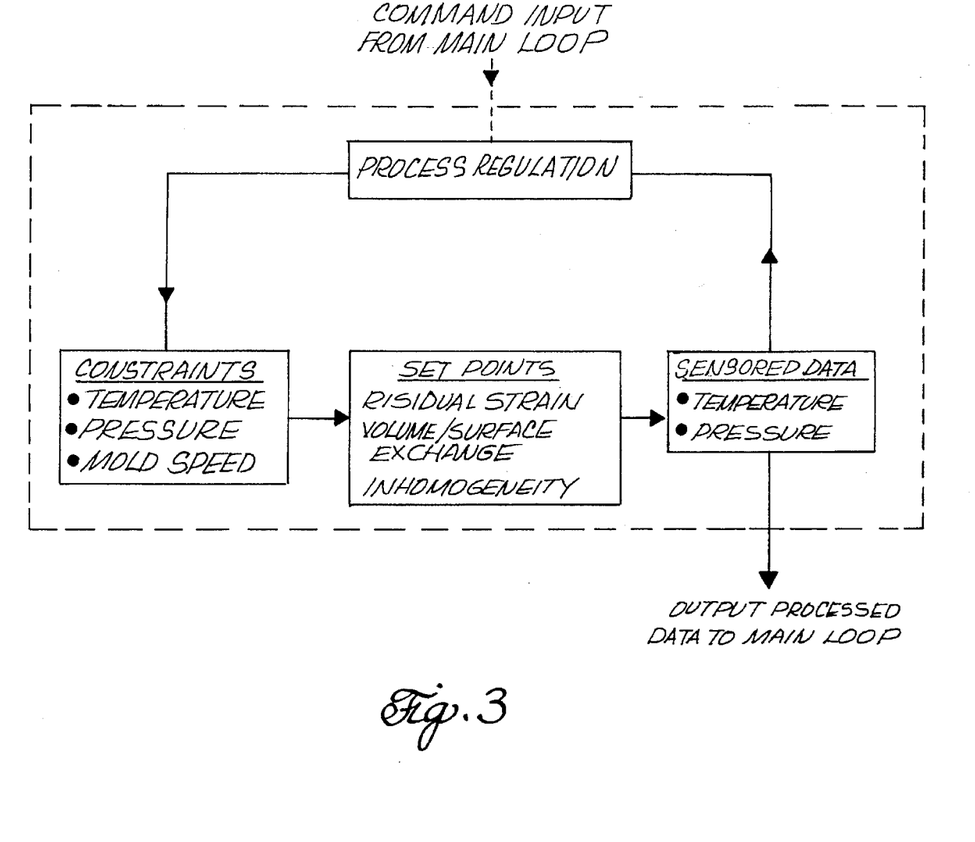
FIG. 3 is a schematic flow chart of a knowledge-based control loop of this invention.

A knowledge-based control loop makes the decision for the on-line control, the details of which are displayed in FIG.

3. Set points for the control loop parameters can be adjusted in an on-line basis according to the preset schedules. This would involve setting threshold values for the pressure, temperature and mold speed based on the requirements for properties of the product material. Limitations on the residual stress and/or the change of volume to surface area ratio could be possible quality criteria.

Figure 4:
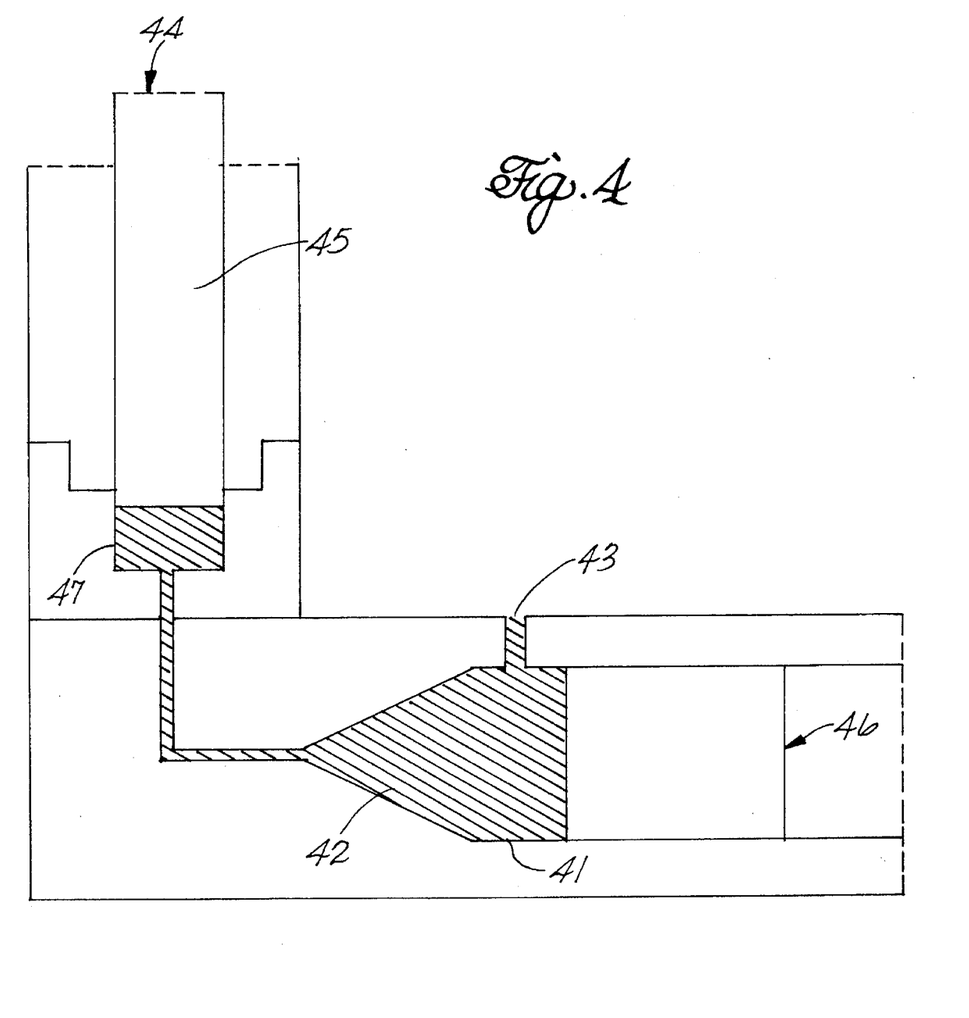
FIG. 4 is a schematic side view of a single section mold with a fixed cross-section according to this invention.

The feeding rate and the position of the injected material could be best controlled by a system as shown in FIG. 4. A material 42 of a metal or a polymer in a viscous state is fed through an opening 43 into the injector 41. A back-up pressure 44 is exerted through the movable piece 45 to the material 42 being injected while a drive pressure 46 is applied to control the feeding rate of the material 42. In accordance, two degrees of freedom are provided for fine tuning of the evolution process in forming the product 47 and the freedom for varying or controlling the mechanical properties of the product 46.

The present invention will now be described more specifically with reference to the following examples. It is to be noted that the following descriptions of examples including preferred embodiments of this invention are presented herein for purpose of illustration and description it is not intended to be exhaustive or to be limited to the precise form disclosed.

Example 1: Molding a product with a fixed cross-section in a single section mold.

Figure 5:
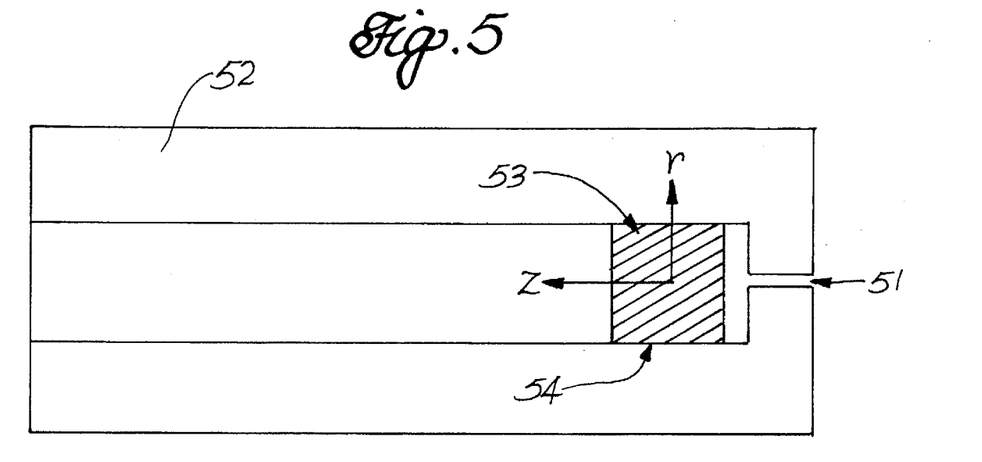
FIG. 5 is a schematic side view of a single section mold with various cross-sections according to this invention.

A simple case of a rectangular or circular cylinder mold is illustrated in FIG. 5. As the injected material, such as a metal or a polymer, fills the mold from an opening 51 at one end of a stationary piece 52, a movable piece 53 moves in the z-direction along the sliding surface 54 of the stationary piece 52 at a predetermined rate. Solidification can be thus controlled to avoid excess buildup of residual stress. The finished product is fixed in cross-section area and shape.

Example 2: Molding a product with variable cross-sections in a single section mold.

Figure 6:
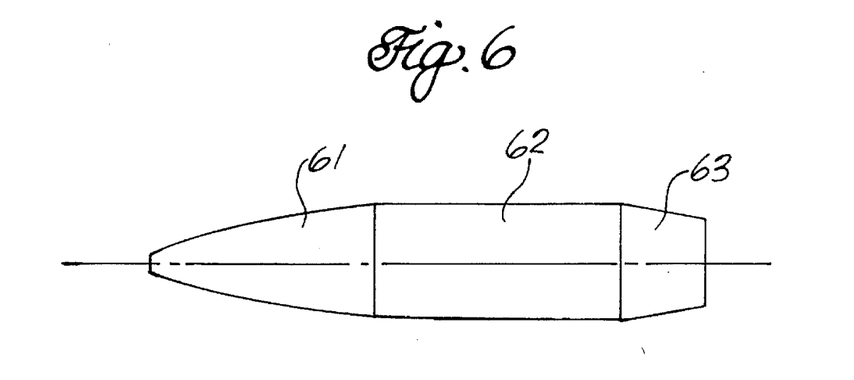
FIG. 6 is a schematic side view of a multiple section mold with various cross-sections wherein the movable piece is at its initial position according to this invention.
Figure 7:
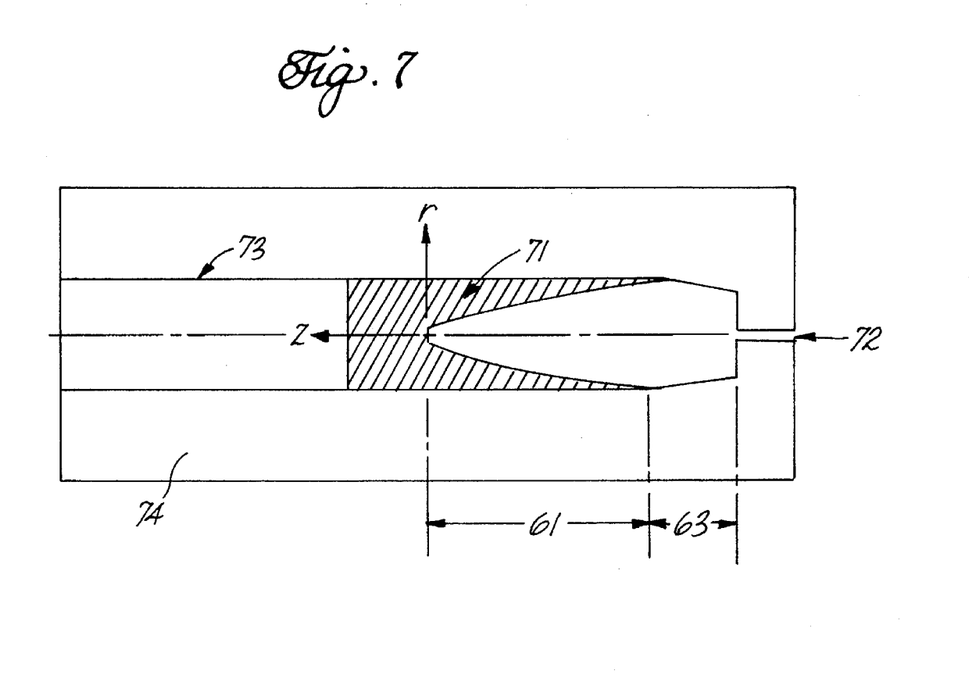
FIG. 7 is a schematic side view of a multiple section mold wherein the movable piece is at its final position according to this invention.
Figure 8:
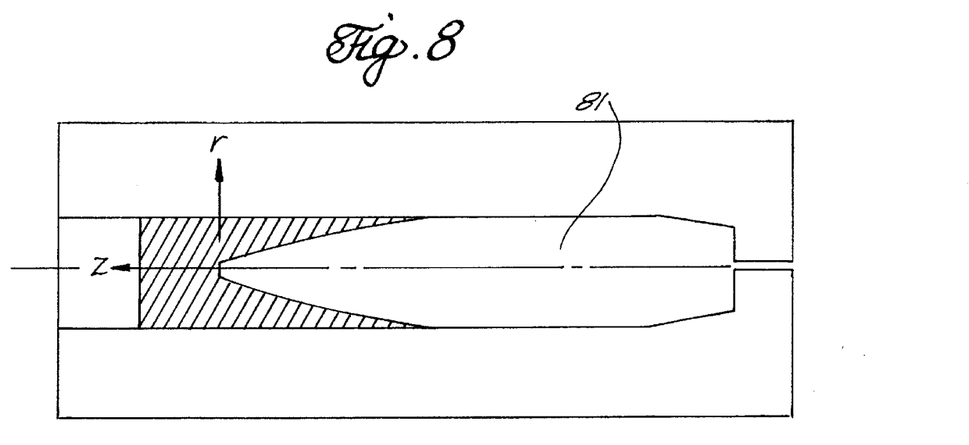
FIG. 8 is a schematic side view of a multiple conical section mold having concentric movable pieces according to this invention.
Figure 9:
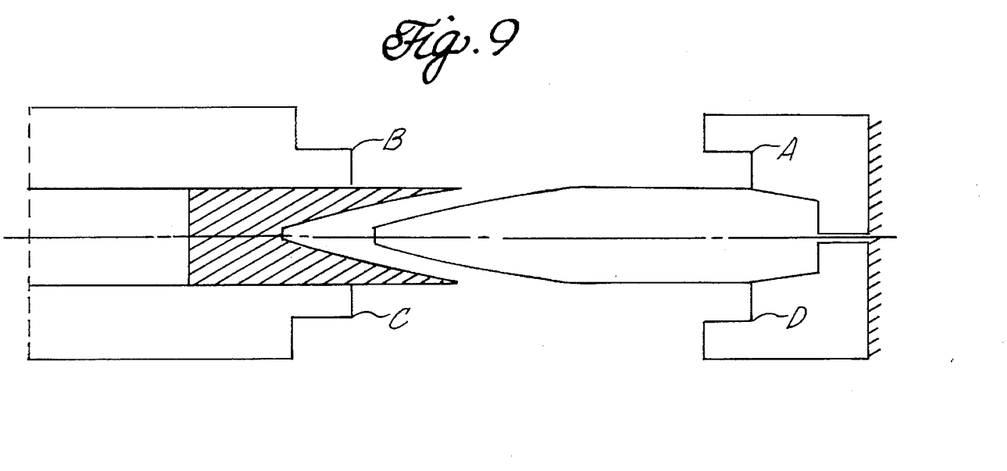
FIG. 9 is a schematic side view for a volume controlled injection molding of a solid sphere according to this invention.

Follow a similar procedure to the aforementioned Example 1 to mold a multiple section product with variable cross-section areas instead. The finished product, as shown in FIG. 6, contains a head section 61, a body section 62, and a tail section 63. The head section 61 could be first formed in a first movable piece 71 while the tail section 63 remains fixed at one mold end having thereon an opening 72 where materials are injected, as shown in FIG. 7. The first movable piece 71 then starts to move along a slide surface 73 of a stationary piece 74 to thus continuously form the body section 62. The complete product 81 has a shape as shown in FIG. 8. The mold design and mold separation of this example are as follows: once the molding process is complete, the mold may be opened or disengaged to remove the finished product. This is illustrated in FIG. 9 for the case of a horizontal mold in an opened position. When the mold is closed, points B and C coincide with points A and D.

Example 3: Molding a product with continuously varied cross-sections in a multiple section mold.

Figure 10:
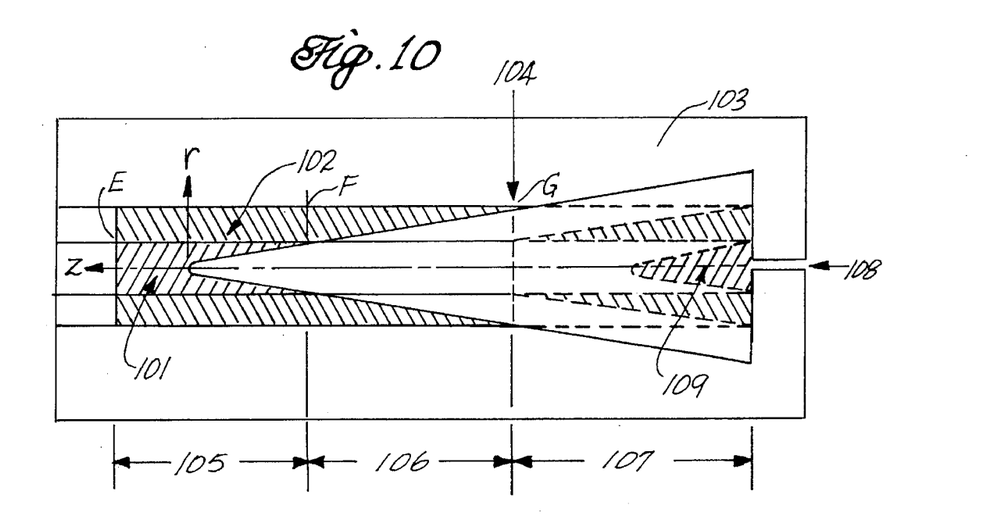
FIG. 10 is a schematic side view of a disengaged mold in an opened position according to this invention.

For more complex sections where the cross-section may change continuously in the longitudinal z-direction, a multiple section mold may be used. Consider the conical configuration as shown in FIG. 10 and use a first movable piece 101 and a second movable piece 102 for illustration. A base section 107 on the stationary piece 103 can be a fixed portion of the mold. The first movable piece 101 and the second movable piece 102 are concentric and may slide with respect to one another. At the very beginning, the positions of points E, F and G are at the same line 104 such that a front section 105, a middle section 106, and the base section 107 are drawn together near the mold end having thereon an opening 108 where the material is injected. Refer to the dotted lines in FIG. 10. As the cone tip 109 is formed, the first movable piece 101 starts to move at a controlled rate. Motion of the second movable piece 102 could be initiated at any predetermined time; it should be adjusted to yield the desired rate of solidification in relation to the rate change of the volume with respect to the surface area of the formed product.

Example 4: Molding a product with continuously varied cross-sections in a multiple section mold.

Figure 11:
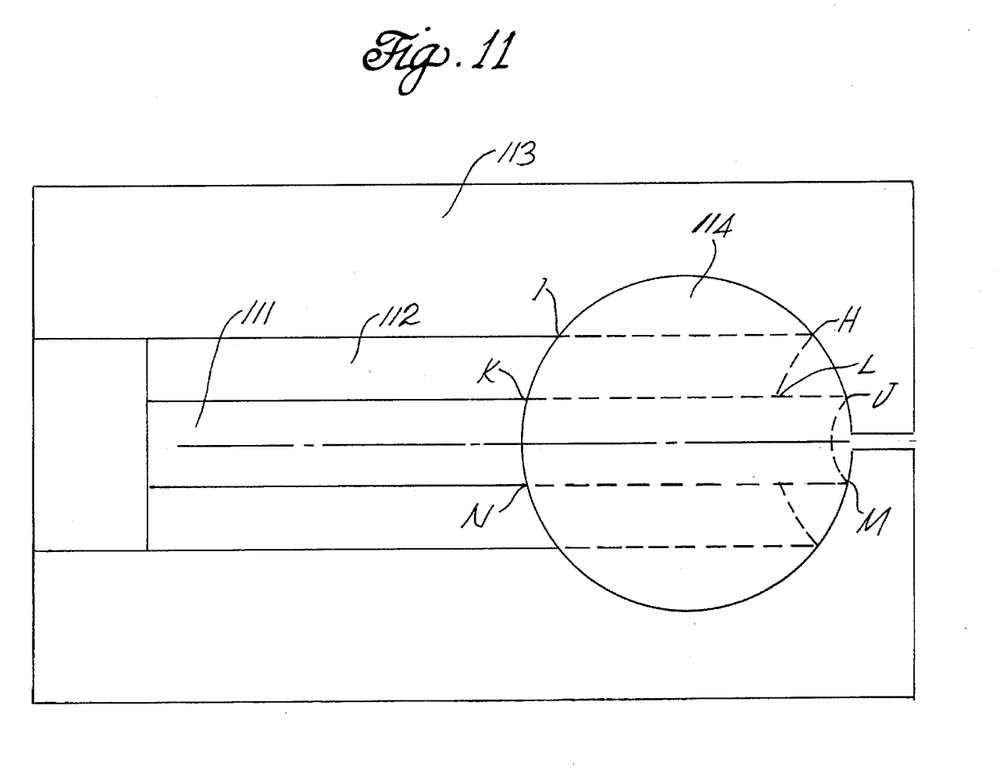
FIG. 11 is a side view showing how the position control of an injected material is effected according to this invention.

Another configuration of interest is the sphere 114 shown in FIG. 11. Again, it is sufficient to use a first movable piece 111 and a second movable piece 112 in addition to a stationary piece 113 for illustration. Both of the first movable piece 111 and the second movable piece 112 can slide relative to one another and with respect to the stationary piece 113. Both ends of pieces 111 and 112 are shaped to have a curvature coincident with the local curvature of the sphere 114 when they are in the fully extended position, i.e. when point H goes to I and point J goes to K. More precisely, the arc JM coincides with arc KN and arc HL with arc IK. The objective is to increase the local volume at a controlled rate. More movable sections could be designed to provide more refined adjustments.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for manufacturing a product by using a progressively expanding mold comprising the steps of:

(a) using a stationary piece having a cavity therein and having an opening at one end thereof;

(b) assembling a first moveable piece and a second movable piece in said cavity of said stationary piece to form said progressively expanding mold corresponding to a shape of said product;

(c) filing an increment of molten material from said opening into a first region between said stationary piece and said first movable piece;

(d) causing said first movable piece to move at an appropriate rate away from said opening and thereby exposing a second region to said opening between said stationary piece and said second moveable piece wherein a further increment of said molten material is filled into said second region;

(e) causing said second movable piece to move away from said opening and thereby exposing a third region to said opening wherein a further increment of molten material is filled into said third region;

(f) allowing said molten material to be solidified to yield said product after said first, second and third regions are filled with said molten material; and (g) taking out said product from said progressively expanding mold.

2. A process for manufacturing a product by using a progressively expanding mold as claimed in claim 1, wherein said second movable pieces is caused to move at a rate the same as that of said first movable piece.

3. A process for manufacturing a product by using a progressively expanding mold as claimed in claim 1, wherein said second movable pieces is caused to move at a rate different from that of said first movable piece.

4. A process for manufacturing a product by using a progressively expanding mold as claimed in claim 1, wherein said first and second movable pieces are caused to move in said cavity during mold separation in order to separate said mold with relative ease.

5. A process for manufacturing a product by using a progressively expanding mold as claimed in claim 1, wherein said opening is located at a central portion of said one end.

6. A process for manufacturing a product by using a progressively expanding mold as claimed in claim 1, wherein said molten material is one selected from a group consisting of metals, polymers, and inorganic chemicals.

7. A process for manufacturing a product by using a progressively expanding mold as claimed in claim 1, further comprising a control system to control said rate for moving said first movable piece.

\* \* \* \* \*